US006849968B2

(12) United States Patent
Park

(10) Patent No.: US 6,849,968 B2
(45) Date of Patent: Feb. 1, 2005

(54) SWITCH UNIT

(76) Inventor: Hyung-Sik Park, 202 Songgwang Mansion, 551 Punghyang-dong, Buk-gu, Gwangju (KR), 500-880

( * ) Notice: Subject to any disclaimer, the term of this patent is extended or adjusted under 35 U.S.C. 154(b) by 6 days.

(21) Appl. No.: 10/416,509

(22) PCT Filed: Nov. 21, 2001

(86) PCT No.: PCT/KR01/02005

§ 371 (c)(1),
(2), (4) Date: Jun. 6, 2003

(87) PCT Pub. No.: WO02/43091

PCT Pub. Date: May 30, 2002

(65) Prior Publication Data

US 2004/0070512 A1 Apr. 15, 2004

(30) Foreign Application Priority Data

Nov. 21, 2000 (KR) ........................................ 2000-32544

(51) Int. Cl.$^7$ .............................. H02B 1/24; H01H 9/00
(52) U.S. Cl. ...................... 307/112; 200/308; 307/116; 307/125; 340/635; 340/638
(58) Field of Search .................................. 307/9.1–10.8, 307/38–42, 112–141.8; 340/635, 638, 642–644; 200/308–317

(56) References Cited

U.S. PATENT DOCUMENTS 5,162,665 A * 11/1992 Troyen ........................ 307/112

FOREIGN PATENT DOCUMENTS

| JP | 07015880 A | * | 1/1995 | ............. H02J/4/00 |
| KR | 1998-047161 | * | 9/1998 | ........... H05B/41/36 |
| KR | 163940 B1 | * | 3/1999 | .......... H03K/17/00 |
| KR | 199582 Y1 | * | 8/2000 | ............ H04Q/9/00 |
| WO | WO 02/43091 A1 | * | 5/2002 | ............ H01H/9/16 |

* cited by examiner

Primary Examiner—James R. Scott
(74) Attorney, Agent, or Firm—Greenblum & Bernstein, P.L.C.

(57) ABSTRACT

A switch unit allows a user to perform an on-and-off switching control of a load which is installed in a certain place without having the user move to the load position and confirm the control status of the load. The switch unit includes a local switching unit having a plurality of buttons each coresponding to each load which is installed in a current place, for directly selecting a load to be switching-controlled, an overall switching unit fabricated in the form of a dial, for selecting a load to be switching-controlled, an overall display unit having a number of LEDs, for displaying the switching control state of each load, an all-off switch which is slightly sunk from the surface of the switch unit, for switching all the loads entirely, and a remote controller signal receiver for receiving a remote controller signal. The switch unit further includes a FND display unit for displaying a load corresponding to the current dial position in the overall switching unit with a numerical symbol. Thus, a power source can be easily, conveniently and efficiently used and managed, to thereby provide users with a considerable power saving effect and conveniences.

10 Claims, 3 Drawing Sheets

SWITCH UNIT

TECHNICAL FIELD

The present invention relates to a switch unit for allowing a user to perform an on-and-off switching control of a load which is installed in a certain place without having the user move to the load position and confirm the control status of the load, and more particularly, to a switch unit which facilitates an on-and-off switching control and an on-and-off switching control status confirmation with respect to all kinds of loads which are subject to switching controls.

BACKGROUND ART

Typically, manual switches or remotely controlled switches using remote controllers are being used as switches for switching power sources. However, in the case of the existing switches, users should move to the places where the switches are installed, in order to manipulate the switches, which causes much inconveniences to the users.

To solve the above existing problem, one of the prior art techniques was proposed in Korean Patent Application No. 95-2959 filed on Feb. 16, 1995 (Korean Laid-open Publication No. 95-28306 on Oct. 18, 1995) entitled "Switching system" by the same inventor as that of the present invention. In this prior art, a user who exists in any one of a plurality of rooms which are partitioned with each other can control loads which are installed in other rooms and confirm the on-and-off states of various loads.

DISCLOSURE OF THE INVENTION

To solve the above problems, it is an object of the present invention to provide a switch unit which is fabricated to perform functions such as on-and-off manipulation and on-and-off state monitoring of all loads which are connected to a switching system more conveniently.

To accomplish the above object of the present invention, there is provided a switch unit comprising: a local switching unit having a plurality of buttons each corresponding to each load which is installed in a current place, for directly selecting a load to be switching-controlled by pressing one of the plurality of buttons; an overall switching unit fabricated in the form of a dial, for selecting a load to be switching-controlled by turning the dial in left and right directions and then pressing the dial at a selected position, in order to perform a switching control; an overall display unit for displaying the switching control state of each load which is switching-controlled by the overall switching unit; an all-off switch which is slightly sunk from the surface of the switch unit, for switching all the loads entirely; and a remote controller signal receiver for receiving a remote controller signal.

Preferably, the elements form the external appearance of the switch unit.

BRIEF DESCRIPTION OF DRAWINGS

The above object and other advantages of the present invention will become more apparent by describing the preferred embodiments thereof in more detail with reference to the accompanying drawings in which.

BEST MODE FOR CARRYING OUT THE INVENTION

Preferred embodiments of the present invention will be described in detail with reference to the accompanying drawings.

Figure 1A:
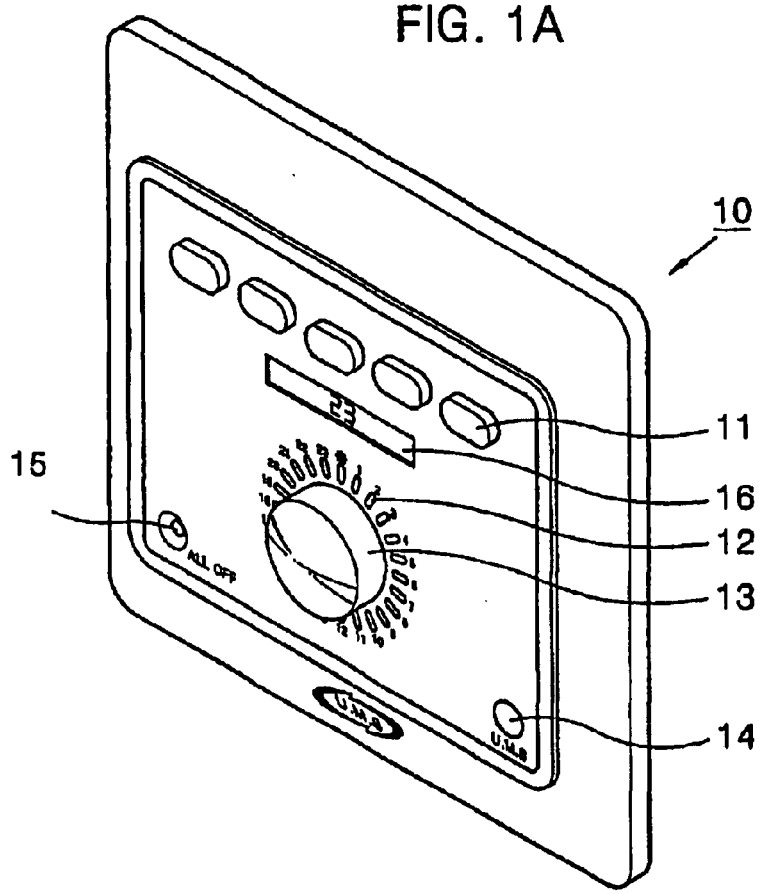
FIGS. 1A and 1B show external appearances of switch units according to respective embodiments of the present invention.

A switch unit shown in FIG. 1A, includes a local switching unit 11 having a plurality of buttons each corresponding to each load which is installed in a current place, for directly selecting a load to be switching-controlled by pressing one of the plurality of buttons. As shown in FIG. 1A, the local switching unit 11 is located in the uppermost portion of the switch unit. An overall switching unit 13 for selecting a load to be switching-controlled among all loads is located in the lower portion of the local switching unit 11. Here, the overall switching unit 13 is fabricated in the form of a dial. Thus, the dial-form overall switching unit 13 can be rotated in either of left and right directions to enable a user to establish a sequential setting with an ascending or descending sequence. That is, assuming that there are first to twenty-third loads, since the loads can be set in an ascending sequence from the first load up to the twenty-third load, or in a descending sequence from the twenty-third load down to the first load, which facilitates a setting operation and reduces a setting time. A FND (Multisegmented LED Displays) display 16 is disposed between the local switching unit 11 and the overall switching unit 13, in which a load corresponding to a position of the current dial switch in the overall switching unit 13 is displayed in a numeric figure.

Figure 1B:
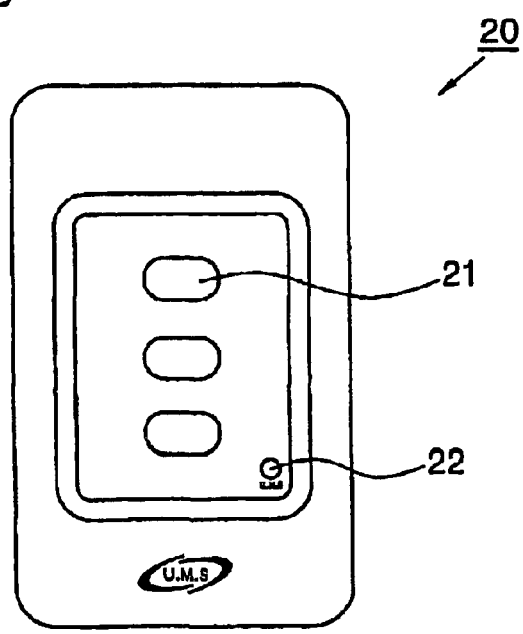

An overall display unit 12 having a plurality of light emitting devices (LEDs) for displaying the switching control state of each load which is switching-controlled by the overall switching unit 13 is disposed around the dial of the overall switching unit 13. In the switch unit shown in FIG. 1A, an all-off switch 15 for switching off the entire loads and a remote controller signal receiver 14 for receiving a remote controller signal are disposed in the lower portion of the switch unit. The above-described switch unit is preferably used in a living room or a parlor as a main control switch 10. The part of functions of the switch unit shown in FIG. 1A can be omitted or curtailed, in which a sub-control switch 20 having a local switching unit 21 for switching local loads and a remote controller signal receiver 22 for receiving a remote controller signal are fabricated as shown in FIG. 1B.

Figure 2:
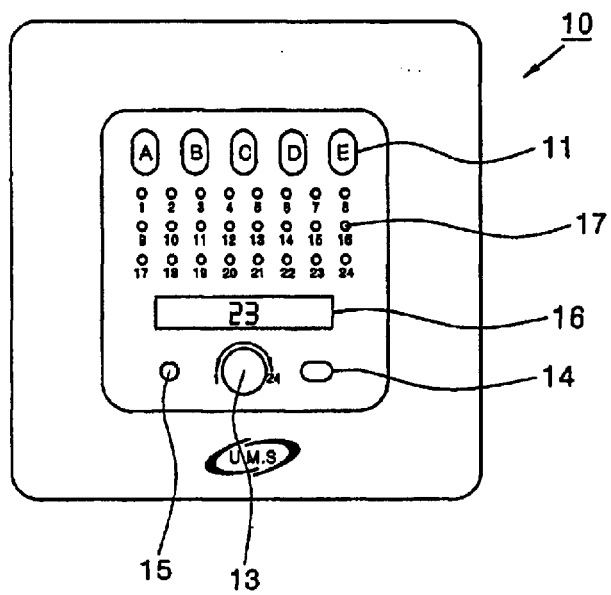
FIG. 2 shows an external appearance of a switch unit according to another embodiment of the present invention.

Meanwhile, a modified embodiment of the switch unit shown in FIG. 1A is shown in FIG. 2. The switch unit shown in FIG. 2 is assigned with the same reference numerals with respect to the same elements as those of the FIG. 1A switch unit. The switch unit of FIG. 2 includes an overall display unit 17 disposed in the form of a matrix, instead of the overall display unit 12 in which LEDs are disposed around the dial of the overall switching unit 13 in the FIG. 1A switch unit. The internal configuration of the switch unit having the FIG. 2 external appearance is illustrated in FIGS. 3A and 3B, respectively.

Figure 3A:
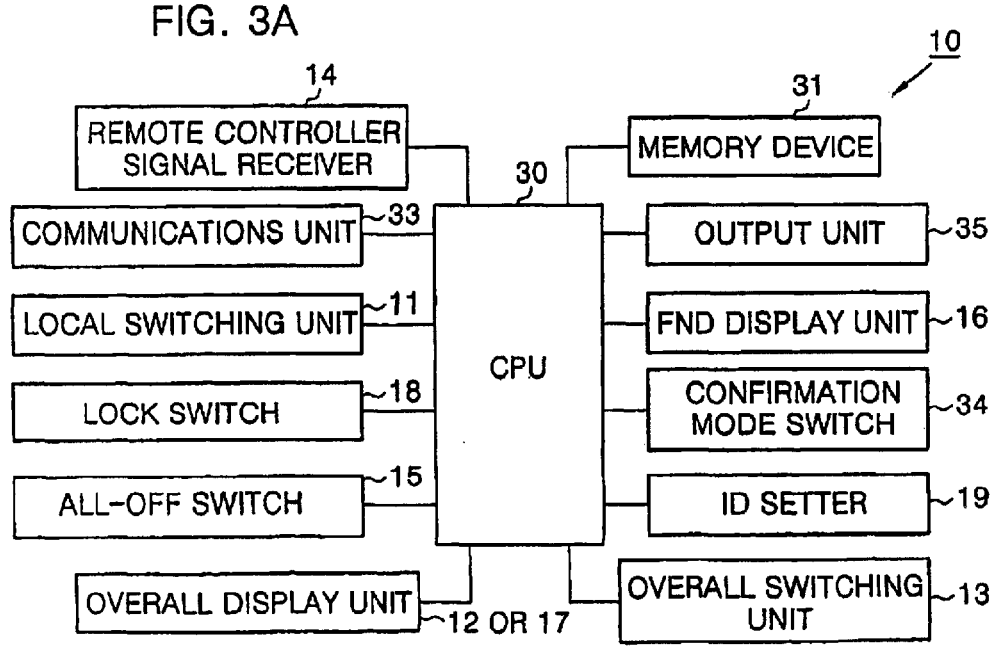
FIGS. 3A and 3B are block diagrams showing the internal structures of the switch units according to respective embodiments of the present invention.
Figure 3B:
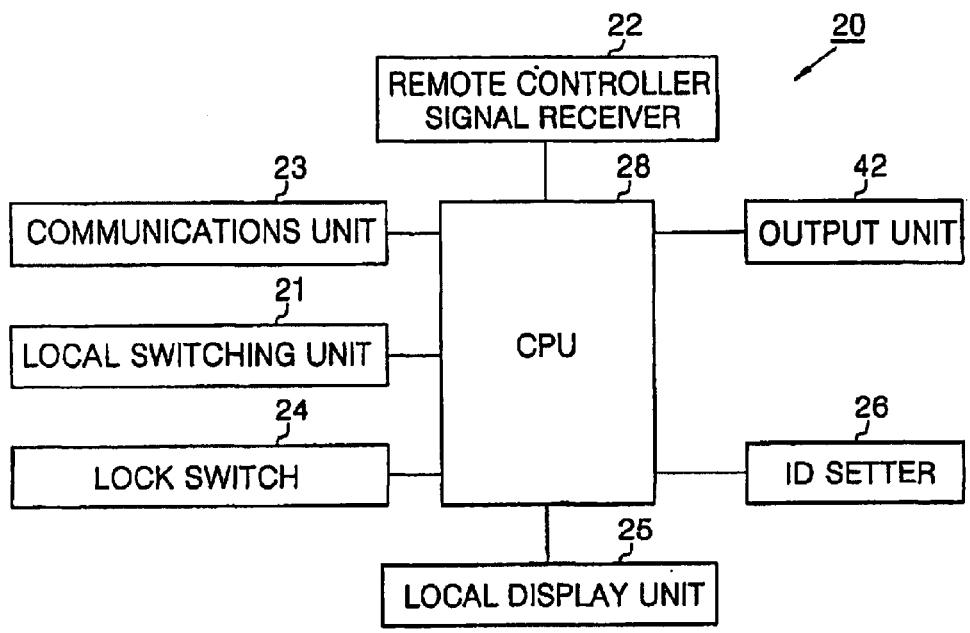

FIGS. 3A and 3B are block diagrams showing the internal structures of the switch units according to respective embodiments of the present invention. The switch unit shown in FIG. 3A is a main control switch 10 having the external appearance of FIG. 1A or FIG. 2, having a local switching unit 11 for directly switching-controlling local loads. An overall display unit 12 or 17 is made of a plurality of LEDs, for displaying a light-emission state of each load. The switch unit of FIG. 3A includes an overall switching unit 13 for setting switching operations of overall loads, a remote controller signal receiver 14 for receiving a remote controller signal, and an all-off switch 15 for switching off all the loads simultaneously. An identification (ID) setter 19 sets an inherent ID for each load. A memory unit 31 stores the inherent ID with respect to each set load. Meanwhile, the switch unit of FIG. 3A includes a FND display 16 for displaying a load corresponding to the position of the current dial in the overall switching unit 13 in a numerical figure, a switch 18 having a lock function, for preventing a certain room having a local load from being switching-controlled and state-monitored in other rooms, and a communications unit 33 for communicating with switch units in other rooms. A central processing unit (CPU) entirely controls the operation of each element. The CPU includes a confirmation mode switch 34 for temporally confirming the switching states of the loads. The operation of the switch unit having the above-described configuration will be described in detail with respect to FIGS. 4A and 4B.

Referring to FIG. 3A, if a signal for controlling a desired load is applied from a remote controller (not shown), a remote controller signal receiver 14 outputs the applied remote controller signal to a CPU 30. The CPU 30 decodes the input remote controller signal and drives LEDs on the overall display unit 12 or 17 in correspondence to a corresponding load, to thereby display the operational state of the load and control an on-and-off switching operation of the corresponding load. Of course, in the case that a corresponding load is installed in another room which is not a room where a user is, the CPU 30 performs a switching control through the communications unit 33 with a switch unit of a room where a corresponding load is installed. In the case that the corresponding load is a local load in a room where he or she is, the CPU 30 turns on and off a power source for the corresponding load through an output unit 35, to thereby perform a switching control.

Also, in the case that a user wishes to perform a switching control of a local load directly, a button corresponding to a corresponding load in the local switching unit 11 provided in the switch unit is directly pressed. In this case, the CPU 30 which receives the button press signal drives LEDs on the overall display unit 12 or 17 in correspondence to the load, to display the operational state of the load, and perform a switching control of the local load connected through the output unit 35.

Meanwhile, when a user manipulates the overall switching unit 13 in order to select a load to be controlled among a number of connected loads, he or she turns the overall switching unit 13 in the form of a dial and sets a desired load as shown in FIG. 1A or 2. When the user turns the dial, the corresponding LED in the overall display unit 12 or 17 which are disposed around the dial lights on and off in sequence according to the turning direction of the dial. When the dial is pressed after the turning of the dial is stopped, the light emission state of the corresponding load, that is, the corresponding room is inverted. A number of loads can be set in the overall switching unit 13. The CPU 30 controls the switching of the loads which have been set in the overall switching unit 13 as described before. In the case that all the connected loads are turned off, the all-off switch 15 is manipulated. The CPU 30 having received the signal from the all-off switch 15 performs a switching control to turn off the power source of all the connected loads and simultaneously turns off all the LEDs on the overall display unit 12 or 17 to show the switching state. Here, the all-off switch 15 is slightly sunk as shown in FIG. 1A, and is designed to operate only if it is pressed continuously for a predetermined time, for example, three seconds, in order to prevent children's mischief. Also, in the case that the switch unit has been designed so that the switching state of a corresponding load cannot be confirmed in other rooms, the lock switch 18 is manipulated. The CPU 30 having received the signal from the lock switch 18 locks the local load so that the switching state of the local load cannot be confirmed in other rooms. Of course, if the lock switch 18 is turned on, the switching control of the local load cannot be performed in other rooms, but can be switching-controlled with local switch unit or remote controller. Also, if a user presses a confirmation mode switch 34, the CPU 30 having received the signal from the confirmation mode switch 34 shows the current switching states of the connected loads for a predetermined time, by driving LEDs on the overall display unit 12 or 17 to make the user confirm, and then turn off the LEDs. Here, the locked load is not displayed on the overall display unit 12 or 17.

Figure 4A:
FIGS. 4A and 4B show display states with respect to the FND display of FIG. 3A.
Figure 4B:
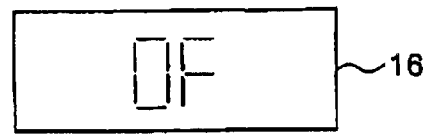

Meanwhile, the switch unit further includes a FND display 16. Accordingly, a corresponding LED can be turned on when the dial of the overall switching unit 13 and the number of the load can be displayed numerically, with a result that the user can find the load number easily under the dark situations. For example, if a load corresponding to the position of the current dial in the overall switching unit 13 is a load numbered by "2", a figure of "2" is displayed on the FND display 16. In this state, if the dial of the overall switching unit 13 is pressed to set a load, an on-state representation is symbolically displayed on the FND display 16 for about three seconds, as shown in FIG. 4A, and then disappears. Reversely, in the case of an off-state, the off-state representation is displayed symbolically as shown in FIG. 4B.

The above-described configuration is made into a single unit and a number of units are made into a switching system. In the same system, the same signal can be transferred between the respective units via a communications unit 33. Also, the above-described configuration is simplified as shown in FIG. 3B, to be applied as a sub-control switch 20 as shown in FIG. 1B. That is, the sub-control switch 20 controls switching of only the local load via a local switching unit 21 or a remote controller signal receiver 22 which receives a remote controller signal, and controls a local display unit 25 made of LEDs to have the user confirm the switching control state. The sub-control switch 20 sets an inherent ID of the local load in his or her own room which is located in a place where the sub-control switch 20 is installed, through an ID setter 26 formed of a dip switch. Also, the sub-control switch 20 communicates with a communications unit 33 in the main control switch 10 through the communications unit 23, to thereby operate under the control of the main control switch 10.

As described above, the switch unit according to the present invention sets and controls a desired load conveniently in any places, and easily monitors an on-and-off state for each load, to thereby use and manage a power source efficiently, which provides an effect of considerably saving power and giving users with much conveniences.

INDUSTRIAL APPLICABILITY

As described above, the switch unit according to the present invention can be widely used in a switch for switching on and off power for indoor lighting lamps, and various electric and electronic appliances, a home automation, and an alarming system.

What is claimed is:

1. A switch unit comprising:

a main control switch for performing a switching control of loads which is installed in other places and monitoring the switching control state in each one place; and a sub-control switch for performing a switching control of only the loads installed in each one place, wherein said main control switch comprises a local switching unit having a plurality of buttons each corresponding to each load which is installed in a current place, for directly selecting a load to be switching-controlled by pressing one of the plurality of buttons;

an overall switching unit fabricated in the form of a dial, for selecting a load to be switching-controlled by turning the dial in left and right directions and then pressing the dial at a selected position, in order to perform a switching control;

an overall display unit for displaying the switching control state of each load which is switching-controlled by the overall switching unit;

a FND display for displaying representation of the load corresponding to the position of the current dial in the overall switching unit with a numerical figure;

an all-off switch which is slightly sunk from the surface of the switch unit, for switching all the loads entirely; and a remote controller signal receiver for receiving a remote controller signal for remote control, wherein said sub-control switch comprises a local switching unit having a plurality of buttons each corresponding to each load which is installed in a current place, for directly selecting a load to be switching-controlled by pressing one of the plurality of buttons; and a remote controller signal receiver for receiving a remote controller signal for remote control, wherein said elements form the external appearance of the switch unit.

2. The switch unit of claim 1, wherein said overall display unit comprises a number of LEDs corresponding to the loads.

3. The switch unit of claim 2, wherein the LEDs on said overall display unit are disposed around the dial of the overall switching unit.

4. The switch unit of claim 2, wherein the LEDs on said overall display unit are disposed in a matrix form.

5. The switch unit of claim 1, wherein said all-off switch functions only if the all-off switch is pressed for a predetermined time continuously.

6. The switch unit of claim 1, wherein said FND display displays the load number corresponding to the position of the current dial in the overall switching unit with a numerical figure, and displays an on-and-off switching state symbolically with an on- or off-representation for a predetermined time if the dial is pressed at the state where the load number is displayed.

7. The switch unit of claim 1, wherein said main control switch comprises:

a communications unit for performing communications with respect to an on-and-off control and a control state between respective units;

an ID setter for setting an inherent ID for each load;

a memory device for storing the inherent ID for each load set by the ID setter;

a lock switch for performing a locking function so that a switching control and the switching control state of the local load cannot be confirmed in other rooms; and a CPU for entirely controlling the operation of each element.

8. The switch unit of claim 1, wherein said sub-control switch comprises:

a communications unit for performing communications with respect to an on-and-off control and a control state between respective units;

an ID setter for setting an inherent ID for the local load;

a lock switch for performing a locking function so that a switching control and the switching control state of the local load cannot be confirmed in other rooms;

a local display unit for displaying the switching state of the local load; and a CPU for entirely controlling the operation of each element.

9. The switch unit of claim 1, wherein said switch unit forms a single switching system via communication connection between a plurality of main control switches and sub-control switches.

10. The switch unit of claim 9, wherein said sub-control switch operates under the control of the main control switch through communications in the same system as that of the main control switch.

* * * * *

UNITED STATES PATENT AND TRADEMARK OFFICE
CERTIFICATE OF CORRECTION

PATENT NO. : 6,849,968 B2
DATED : February 1, 2005
INVENTOR(S) : H. Park

It is certified that error appears in the above-identified patent and that said Letters Patent is hereby corrected as shown below:

<u>Title page,</u>
Item [76], Inventor, "Gwangiu" should be -- Gwangju --.

Signed and Sealed this

Twentieth Day of September, 2005

JON W. DUDAS
*Director of the United States Patent and Trademark Office*